United States Patent [19]

Rhodes

[11] Patent Number: 4,793,143
[45] Date of Patent: Dec. 27, 1988

[54] ENTHALPIC HEAT PUMP DESICCANT AIR CONDITIONING SYSTEM

[76] Inventor: Barry V. Rhodes, Rte. 1, Box 92, Johnston Rd., Chickamauga, Ga. 30707

[21] Appl. No.: 103,030

[22] Filed: Sep. 30, 1987

Related U.S. Application Data

[62] Division of Ser. No. 838,520, Mar. 10, 1986, Pat. No. 4,700,550.

[51] Int. Cl.$^4$ .............................................. F25D 17/06
[52] U.S. Cl. ........................................... 62/93; 55/28
[58] Field of Search ............... 62/92, 271, 93; 55/208, 55/410, 27, 28

[56] References Cited

U.S. PATENT DOCUMENTS

| | | | |
|---|---|---|---|
| 1,819,643 | 8/1931 | Fleisher | 62/271 X |
| 2,038,071 | 4/1936 | Wilhelm | 55/410 X |
| 2,090,287 | 8/1937 | Cornelius | 62/92 |
| 2,332,975 | 10/1943 | Palmer | 62/92 X |
| 3,296,773 | 1/1967 | Hemstreet | 55/208 |
| 4,430,864 | 2/1984 | Mathiprakasam | 62/94 |
| 4,467,785 | 8/1984 | Langford | 62/92 |

FOREIGN PATENT DOCUMENTS 1039318  2/1984  U.S.S.R. ................................ 62/271

*Primary Examiner*—Henry A. Bennet
*Attorney, Agent, or Firm*—Daniel H. Kane, Jr.

[57] ABSTRACT

An improved desiccant air conditioning system includes at least one heat exchanging desiccant bed having desiccant material surfaces defining air passageways through the desiccant bed. The desiccant material surfaces adsorb moisture from building air during an adsorption phase and desorb moisture into exhaust air during a desorption phase. The heat exchanging desiccant bed is formed with refrigerant circulating channels or tubes in heat exchange relationship with the desiccant material surfaces. A heat pump system is also provided including an evaporator, compressor, condenser, and metering device operatively coupled by a refrigerant circulating line for evaporation of refrigerant and transfer of heat to the refrigerant from air in the evaporator air passageways during a coincident adsorption/evaporation phase and for condensation of refrigerant and transfer of heat from the refrigerant to air in the condenser air passageways during a coincident desportion/condensation phase. The refrigerant circulating channels are operatively coupled in the refrigerant circulating line of the heat pump system so that the heat exchanging desiccant bed comprises either the evaporator or the condenser or a component element of the evaporator or condenser. Various combinations of desiccant bed elements and heat pump elements are described. A heat pump desiccant bed air conditioning system is also provided by operatively coupling a heat pump between sources of relatively hot and cold heat transfer liquid of a non-change of phase heat transfer liquid circulating heat exchanging desiccant bed.

5 Claims, 7 Drawing Sheets

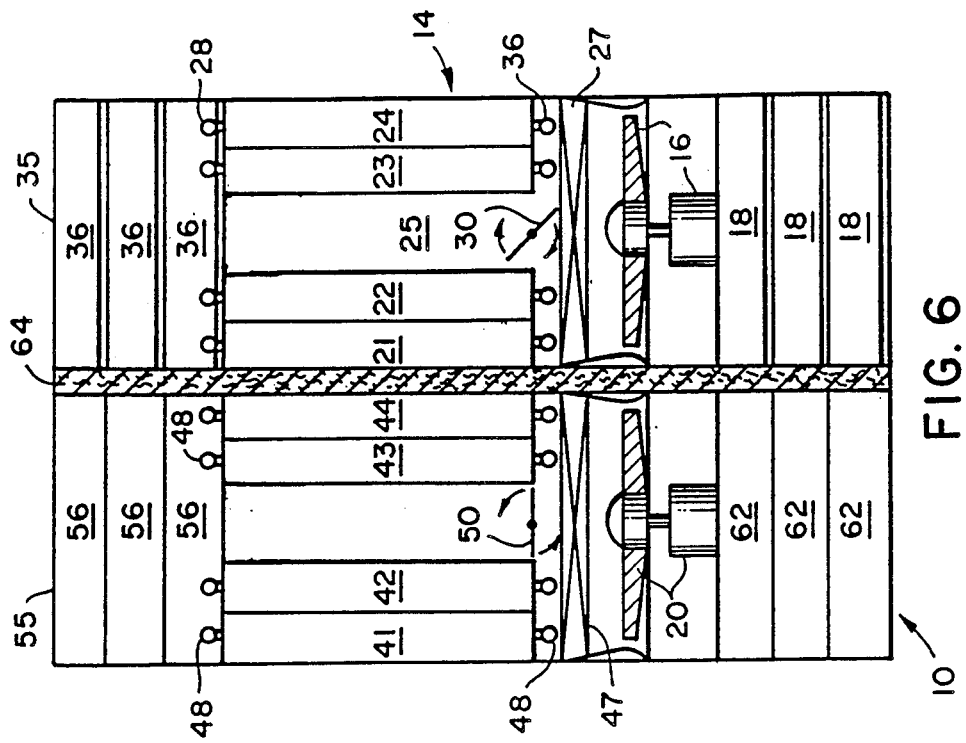
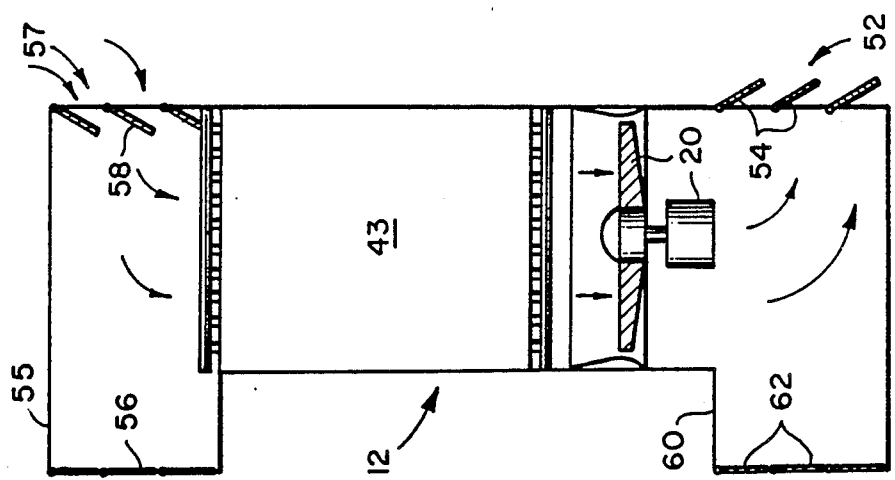

ENTHALPIC HEAT PUMP DESICCANT AIR CONDITIONING SYSTEM

This is a division of application Ser. No. 838,520, filed Mar. 10, 1986, now U.S. Pat. No. 4,700,550.

TECHNICAL FIELD

This invention relates to desiccant air conditioning systems and to heat pump systems The invention provides new air conditioning systems with complementary and integrated desiccant bed and heat pump technology for reverse cycle cooling and heating, drying and humidifying, and controlled comfort zone air conditioning generally.

BACKGROUND ART

In desiccant bed air cooling and air conditioning systems, hot humid air enters the intake side of a desiccant bed. Water vapor and moisture is adsorbed on the extended desiccant material surface areas of the bed, drying the air and releasing latent heat of condensation. The hot dry air may then pass through a heat exchanger giving up some of the heat to an exhaust air stream. The air is then reconditioned by evaporative cooling through an evaporative cooling element or unit where moisture is evaporated back into the air for example by spraying. It is intended by this final evaporative cooling step to achieve a desired temperature and humidity in the comfort zone range. The desiccant bed is periodically recharged by passing hot exhaust air through the bed to evaporate or "desorb" moisture from the desiccant material.

In applicant's pending U.S. patent application, Ser. No. 750,932, filed July 1, 1985, there is described an improved "Desiccant Solar Air Conditioning System" incorporating a novel desiccant bed structure in the form of a liquid-to-air and air-to-liquid heat exchanging desiccant bed. The desiccant bed is composed of desiccant material surfaces such as granular extended surface area desiccant material defining air passageways through the desiccant bed. Fluid circulating channels are formed through the desiccant bed for circulating heat transfer liquids such as water in heat exchange relationship with the desiccant bed.

The desiccant bed structure of U.S. Ser. No. 750,932 is provided by parallel heat conducting metal plates or fins establishing the air passageways with granular desiccant material such as silica gel granules or spheres intimately bonded to the heat conducting surfaces by an adhesive bonding layer. Humid air passes through the air passageways of the desiccant bed for condensation and adsorption of moisture on the extended surface area of the desiccant material during an adsorb cycle or adsorption phase. Coolant liquid circulates through the fluid circulating channels in heat exchange relationship with the desiccant bed for efficient removal of latent heat of condensation and adsorption from the desiccant bed and desiccant material.

During the desorb cycle or desorption phase heated air is passed through the air passageways of the desiccant bed for evaporating and removing moisture from the saturated or moisture-laden desiccant material. At the same time heated liquid is circulated in the circulating channels in heat exchange relationship with the desiccant bed for importing heat energy from external sources into the system to provide latent heat of vaporization. Thus, the desiccant air conditioning system of U.S. Ser. No. 750,932 is an open system which permits substantial import of energy from external sources and substantial removal of heat energy from the system.

U.S. Ser. No. 750,932 describes a complete air conditioning system constructed and arranged to provide an adsorb cycle or adsorption phase for passing air through the desiccant structure for drying the air for subsequent evaporative cooling, and a desorb cycle or desorption phase for reactivating the desiccant structure using imported heat energy. Subsidiary heat exchange closed loops for both the adsorb and desorb cycles are included in the system to enhance efficiency. Most important, however, the system for the first time provides an efficient air to liquid and liquid-to-air heat exchanging desiccant bed for desiccant air conditioners for net export and import of heat energy at higher efficiency.

Heat pump systems and units providing combination heating and cooling are well known, for example described in the handbook, *Refrigeration and Air Conditioning*, Chapter 11, of the Air Conditioning and Refrigeration Institute, Prentice Hall, 1979. Refrigeration equipment is used in such a way that heat is taken from a heat source and given up to an air conditioned space when heating is desired. In the reverse cycle, heat is removed from the space and discharged in exhaust air when cooling is desired. A standard heat pump system generally includes an evaporator, compressor, condenser, and metering device. The evaporator and condenser are typically air t liquid and liquid-to-air heat exchangers formed with air passageways for passage of air through the evaporator and condenser. A refrigerant circulating line operatively couples the evaporator, compressor, condenser, and metering device. Refrigerant such as Freon (Trademark) expanding through the metering device such as an expansion valve evaporates transferring heat to the refrigerant from air and moisture passing through the evaporator air passageways during an evaporation phase. After compression to higher pressure by the compressor, the refrigerant vapor condenses in the condenser transferring heat from the refrigerant to air and moisture passing through the condenser air passageways during a condensation phase.

A feature distinguishing the heat pump system from a conventional refrigeration cooling cycle is that the heat pump system incorporates a four-way reversing valve for reversing the flow of refrigerant in the refrigerant circulating lines so that the respective functions of the evaporator heat exchanger and condenser heat exchanger may be reversed. To accomplish this, two expansion valves are incorporated in the refrigerant circulating line, one for each heat exchanger operative when the heat exchanger is functioning as an evaporator. A one-way check valve is incorporated in parallel with each expansion valve or other metering device to bypass the expansion valve when the respective heat exchanger is functioning as a condenser. A refrigerant accumulator or reservoir is typically provided as a precaution upstream from the compressor to capture and prevent any liquid refrigerant from entering the compressor during the reversal of cycles. A more complete description of heat pump reverse cycle heating and cooling systems is found in the *Refrigeration and Air Conditioning* handbook reference referred to above.

It has not occurred to those skilled in the refrigeration and air conditioning field that heat pump technology and desiccant air conditioning technology might bear a useful relationship. It is not at all apparent that it would be desirable or possible to relate desiccant bed cycles and refrigeration cycles. It is a major discovery of the present invention that in fact the cycles or phases of desiccant bed air conditioner operation bear a productive complementary and synergistic relationship to the cycles or phases of heat pump reverse cycle operation. The present invention develops a new interactive technology of integrated heat pump desiccant air conditioning systems based on a complementary synergistic coincidence and interaction of adsorption and evaporation on the one hand and desorption and condensation on the other hand. The invention provides complete complementary reverse cycle operation all achieved by the novel heat pump and heat exchanging desiccant bed structures of the invention.

The novel change of phase heat exchanging desiccant bed structures of the present invention function alternately as adsorption bed and desorption bed as part of a functional desiccant air conditioning system at the same time that as heat exchangers they function alternately as evaporator and condenser as part of a reverse cycle heat pump heating and cooling system. By the simultaneous operation of this novel structure as an adsorption bed and evaporator on the one hand and as a desorption bed and condenser on the other hand, the synergism of the heat pump technology and desiccant bed air conditioning technology provides a total enthalpy heat pumping system for transfer of both latent and sensible heat with greater efficiency and with potentially near complete utilization of the cycled heat energy. A new method of enthalpy matching air conditioning by coacting adsorption and evaporation and coacting desorption and condensation is provided.

OBJECTS OF THE INVENTION

It is therefore an object of the present invention to provide a new reverse cycle heating and cooling system combining the benefits of desiccant air conditioning systems with heat pump systems.

Another object of the invention is to provide an integrated air conditioning system integrating the absorption phase of a desiccant bed with the evaporation phase of a heat pump heat exchanger on the one hand and integrating the desorption phase of a desiccant bed with the condensation phase of a heat pump heat exchanger on the other hand. A complete enthalpic heat transfer pump is therefore provided, for example, transferring latent heat of adsorption and condensation from moisture adsorbed on the desiccant material surfaces and sensible heat of air in the air passageways to latent heat of vaporization and sensible heat of refrigerant in the desiccant bed circulating channels; and transferring latent heat of condensation and sensible heat from refrigerant in the desiccant bed circulating channels to heat of vaporization of moisture on the desiccant material surfaces and sensible heat of air in the air passageways for desorption of the desiccant bed.

A further object of the invention is to provide new desiccant bed structures for desiccant bed air conditioning systems which incorporate the heat exchange functions of change of phase refrigerant heat pump heat exchangers. The objective is to provide an integrated desiccant bed structure which incorporates both desiccant air conditioning technology and reverse cycle heat pump technology in a complementary and matching relationship.

It is also an object of the invention to provide new air passageway arrangements, refrigerant circulating arrangement, and respective controls for simultaneous reversal of functions between adsorption and desorption phases on the one hand and evaporation and condensation phases on the other hand so that adsorption and evaporation remain coincident and complementary while desorption and condensation remain coincident and complementary during reverse cycle heating and cooling by the novel heat exchanging desiccant bed structures. The invention achieves "enthalpy matching" and thermal enthalpic impedance matching in the transfer of latent and sensible heat across the desiccant bed structure between the processes of adsorption and desorption at the desiccant material surfaces and the processes of evaporation and condensation in the refrigerant circulating channels.

It is intended that the invention be applied for complete stand alone combination heating and cooling systems and for retrofitting systems for adding on to existing air conditioning, heating, and cooling systems.

DISCLOSURE OF THE INVENTION

In order to accomplish these results the invention provides an improved desiccant air conditioning system having at least one desiccant bed comprising desiccant material surfaces defining air passageways through the desiccant bed. The desiccant material surfaces adsorb moisture from building air passing through the desiccant bed during an adsorption phase and desorb moisture into exhaust air during a desorption phase. According to the invention, a heat pump system is also provided including an evaporator, compressor, condenser, and metering device such as an expansion valve. The evaporator and condenser heat exchangers are formed with air passageways for passage of air through the respective evaporator and condenser. A refrigerant circulating line operatively couples the evaporator, compressor, condenser, and metering device for evaporation of refrigerant and transfer of heat to the refrigerant from air in the evaporator air passageways during an evaporation phase and for condensation of refrigerant and transfer of heat from the refrigerant to air in the condenser air passageways during a condensation phase.

The desiccant bed, according to the invention, comprises a heat exchanging desiccant bed having refrigerant circulating channels in heat exchange relationship with the desiccant material surfaces of the desiccant bed for transfer of both latent and sensible heat energy across the bed. The refrigerant circulating channels are operatively coupled in the refrigerant circulating line of the heat pump system so that the heat exchanging desiccant bed comprises either the evaporator or the condenser. The heat exchanging desiccant bed may comprise either the evaporator or condenser in its entirety or comprise one element of the condenser or evaporator coupled in series with traditional evaporator or condenser heat exchangers.

In the preferred example embodiment first and second heat exchanging desiccant beds are incorporated in the system, each with refrigerant circulating channels operatively coupled in the refrigerant circulating line of the heat pump system. One of the heat exchanging desiccant beds functions as the evaporator heat exchanger or a heat exchanging element of the evaporator while the second heat exchanging desiccant bed functions as the condenser or a heat exchanging element of the condenser. The integrated heat pump desiccant bed air conditioning system incorporates controls operatively controlling circulation of refrigerant in the refrigerant circulating line and passage of air in the desiccant bed air passageways so that the adsorption phase on the desiccant material surfaces of the heat exchanging desiccant bed structure coincides with the evaporation phase in the refrigerant circulating channels of the structure. Similarly, the desorption phase on the desiccant material surfaces of the heat exchanging desiccant bed structure coincides with the condensation phase of the refrigerant circulating channels inside the structure. A feature and advantage of this arrangement is that latent and sensible heat energy is exchanged between the processes of adsorption and evaporation in one direction while latent and sensible heat energy is transferred in the other direction between condensation and desorption, resulting in a total latent and sensible heat pump. The total latent and sensible heat energy is referred to herein as "enthalpy". The system is arranged for "enthalpy matching" across the heat exchanging desiccant beds between the desiccant material surface processes of adsorption and desorption and the refrigerant heat pump processes of evaporation and condensation.

The reversing controls include a four-way reversing valve in the refrigerant circulating line for directing refrigerant flow in opposite directions from the compressor. Similarly, directional vanes may be included in air ducts connecting the air passageways of the desiccant beds for diverting and redirecting flow of air through the air passageways. According to further embodiments, reversing fans are provided adjacent to the desiccant beds in association with upstream and downstream one-way louvers in the air ducts for directing building air in one direction through desiccant bed air passageways while directing exhaust air in the opposite direction.

According to the invention, a variety of combinations and permutations of heat exchanging desiccant beds and heat pump systems in interactive combination are provided. For example, in a conventional air conditioning system the condenser alone may comprise a heat exchanging desiccant bed in a split system in which the condenser is located outside the house. The desorption phase of the desiccant bed coincides with the condensation phase of the air conditioner for transfer of latent heat of condensation from the refrigerant to latent heat of desorption and evaporation of moisture on the desiccant material surface. A second heat exchanging desiccant bed operates simultaneously for drying building air and adsorbing and accumulating moisture from the building air onto the desiccant material surfaces. The refrigerant circulating line is alternately coupled between the first and second heat exchanging desiccant beds for alternately operating one bed as the condenser, desorbing and recharging the desiccant bed while the other bed is decoupled from the refrigerant circulating line for adsorbing moisture from building air.

According to another alternative combination, the evaporator of a heat pump system may incorporate a heat exchanging desiccant bed in the air circulating system only with an air duct operatively coupling the air passageways of a conventional evaporator heat exchanger and the air passageways of the desiccant bed for both cooling and drying the air. The desiccant bed may include heat transfer fluid circulating channels in heat exchange relationship with the desiccant material surfaces for transfer of sensible heat energy, for example, by circulating water for cooling the desiccant bed.

Alternatively, the heat exchanging desiccant bed may incorporate refrigerant circulating channels fully incorporated in the refrigerant circulating line of the heat pump system for full operation as a component of the evaporator for transfer of both latent and sensible heat energy referred to herein as enthalpy.

The heat exchanging desiccant beds of the present invention may be integrated in a variety of refrigerant, air conditioning, and heat pump systems including single cycle and reverse cycle heating and cooling systems. Thus, the heat exchanging desiccant beds may comprise either one or both of the evaporator or condenser of such systems or component heat exchanging elements of the evaporator or condenser and may be incorporated for either circulation of change of phase refrigerant for enthalpic heat pump operation or for circulation of a single phase heat transfer liquid such as water as previously described in applicant's pending U.S. patent application Ser. No. 750,932, referred to above. The heat exchanging desiccant beds are adapted for reverse cycle operation alternately operating between adsorption and desorption phases at the desiccant material surfaces of the desiccant air passageways. A feature and advantage of this reverse cycle operation according to the invention is that it complements and coincides with the reverse cycle operation of evaporation and condensation of refrigerants circulating in refrigerant circulating channels within the desiccant bed for full latent and sensible heat pumping between the air and refrigerant. Significantly, the invention provides "enthalpy matching" or thermal enthalpic impedance matching in the enthalpic heat energy transfer across the heat exchanging desiccant bed.

The invention contemplates a variety of air conditioning system structural arrangements for both independent self-contained operation and for retrofitting existing air conditioning systems. For example, the air ducts for passage of air through the system may incorporate bypass airways around the heat exchanging desiccant beds with bypass dampers operatively arranged for controlling the proportion of air in the air duct passing through the bypass airway and passing through the heat exchanging desiccant bed air passageways. The bypass dampers afford additional control over the temperature and humidity of the resulting air in the downstream mixture. Conventional evaporator and condenser heat exchangers with air passageways may be incorporated in the air ducts operatively coupled in series with the air passageways of the heat exchanging desiccant beds or in parallel. In the latter application, for example, the conventional condenser and evaporator heat exchangers may be incorporated in the bypass airways around the heat exchanging desiccant beds. In the preferred form and arrangement of the invention, a conventional evaporator heat exchanger is placed in series in the air duct upstream from the air passageways of the heat exchanging desiccant bed. A second conventional evaporator heat exchanger may also be placed in series downstream from the heat exchanging desiccant bed. A conventional condenser heat exchanger is positioned in series in the air duct upstream from the air passageways of the heat exchanging desiccant bed.

The refrigerant circulating line is coupled on the condenser side to flow first into the condenser heat exchanging desiccant bed and then into the conventional heat exchanging element which is upstream in the air flow. On the evaporator side the refrigerant circulating line is coupled for flow of refrigerant first into the conventional evaporator heat exchanger and then into the evaporator heat exchanging desiccant bed which is also downstream in the air flow. The conventional evaporator heat exchanger cools the incoming air and increases relative humidity for more efficient moisture adsorption in the evaporator desiccant bed. A second conventional evaporator heat exchanger downstream can provide additional air cooling. The conventional condenser heat exchanger preheats exhaust air for more efficient desorption of moisture from the condenser heat exchanging desiccant bed desiccant material surfaces.

The invention provides a variety of heat exchanging desiccant bed structures in addition to those set forth in applicant's U.S. patent application, Ser. No. 750,932. For example, the desiccant bed may be a radiator of parallel vertical metal plates and at least one fluid circulating channel tube passing through the plates in multiple passes perpendicular to and contiguous with the plates. The refrigerant circulating channel tube is sufficiently long and sinuous with multiple passes for complete evaporation of refrigerant in an evaporator desiccant bed. A layer of granular desiccant material such as silica gel granules or spheres is bonded to surfaces of at least some of the metal plates of the radiator. For example, the desiccant material may be bonded by a layer of bonding adhesive to alternate sides only of the metal plates of the radiator, or every other metal plate, to expose metal surfaces for more efficient transfer of heat through the radiator.

The desiccant bed may also be constructed from tubes with adjoining and projecting fins known as tube fins. The fins may be attached to the tubes. The layer of granular desiccant material may be bonded to all exposed metal surfaces or to one side only of the fins or to every other tube fin to enhance heat transfer between the air and refrigerant or heat transfer fluid circulating in the channels of the desiccant bed. Tube plates may also be used for the desiccant bed. Metal particles or granules may also be mixed with the granules of desiccant material to enhance heat transfer between air passing through the desiccant bed and circulating fluid or refrigerant in the circulating channels of the desiccant bed. The desiccant bed may also be provided with two sets of fluid circulating channels, one for a non-change of phase heat transfer fluid and the other for a change of phase circulating refrigerant. A desiccant bed may be manufactured by spraying silicone rubber glue on the exposed metal surfaces or selected surfaces of the radiator, tube fins, or tube plates and then rolling silica gel spheres onto the surfaces for adhesion and bonding to those surfaces coated with the silicone rubber glue.

In the assembled heat pump desiccant air conditioning system, according to the present invention, the desiccant beds may be used to adsorb moisture without use of the heat pump components by using the fan only. Or the heat pump components including the conventional evaporator and condenser heat exchangers may be used alone of reverse cycle heat pump heating operation for heating and humidifying a building space.

The invention also provides a novel heat exchanging structure with conventional heat exchangers and a heat exchanging desiccant bed integrated into a single unitary structure for both evaporators and condensers. According to this aspect of the invention an elongate heat exchanging framework is provided with air passageways defined by fins or plates for passage of air in the elongate direction through the framework. At least one elongate "serpentine" refrigerant channel or tube winds through the framework in heat exchange contiguity. Such a framework may be provided, for example, by stacked arrays of folded tube fins with serpentine refrigerant channel tubes winding in heat exchange relationship with the fins throughout the framework. Stacks of elongate tube plates or an elongate radiator structure may also be used. Along a central band of the framework, the fins or plates are coated with silicone rubber glue or similar bonding adhesives and a layer of granular desiccant material such as silica gel granules or spheres is bonded to the surfaces throughout the central band. A central heat exchanging desiccant bed is therefore provided bounded on either side in the air flow by a conventional metal surface liquid-to-air heat exchanger all in a unitary structure designated HX/DB/HX. The unitary "banded" multiple heat exchanger structure can serve as a complete evaporator or condenser.

A feature and advantage of the enthalpic heat pump desiccant air conditioning system of the present invention is the energy savings achieved over conventional air conditioners. In conventional air conditioners approximately 30% or nearly one third of the system energy is lost at the condenser in exhaust air from the condensation phase or cycle. According to the present invention, the normally wasted heat energy is substantially recovered in the desorption and recharging of the desiccant material surfaces of the heat exchanging desiccant bed condenser. That is, the desorption or recharging phase coincides with the condensation phase utilizing the latent heat of condensation for the latent heat of desorption or vaporization with a consequent savings of approximately 30% of system heat energy or enthalpy. The recharged desiccant bed is available for drying and cooling air in the absorption and evaporation phase to effect this saving of energy.

Additionally, the combination of desiccant air conditioning with heat pump or refrigerant air conditioning according to the invention provides building air with lower specific humidity and moisture content for greater flexibility in the final conditioning of the air to parameters in the desired comfort zone range. For example, at the lower moisture content higher air temperatures are tolerated in the comfort zone. Alternatively a final stage of evaporative cooling or chilling can return a specified level of moisture content and humidity while substantially lowering the air temperature. The structures and systems of the invention thereby afford substantial energy savings and far greater conditioning flexibility in comparison to conventional air conditioners.

Other objects, features, and advantages of the invention are apparent in the following specification and accompanying drawings.

BRIEF DESCRIPTION OF THE DRAWINGS

FIG. 5 is a diagrammatic side cross-section view of the other heat pump desiccant bed of FIG. 3 operating in the desorption phase.

FIG. 6 is a diagrammatic side cross-section view of an upright desiccant bed air conditioning system similar to FIG. 1 but with the conventional heat exchangers in a different configuration and location.

FIG. 10 is a fragmentary end view and FIG. 10A is a fragmentary plan view of one arrangement of fin tubes for a heat exchanging desiccant bed (HXDB).

Figure 1:
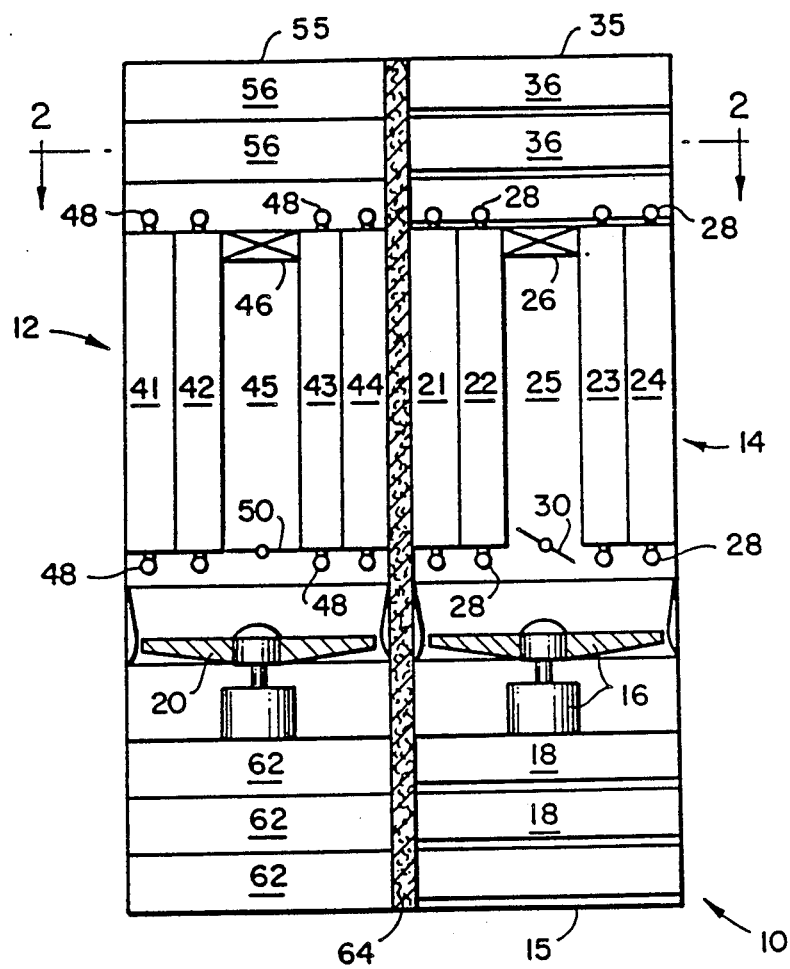
FIG. 1 is a diagrammatic side cross-section view of an upright enthalpic heat pump desiccant bed air conditioning system according to the present invention with complementary desiccant beds for operation alternatively in the coincident adsorption and evaporation phase and the coincident desorption and condenser phase looking in the direction of the arrows on line C—C of FIG. 2.
Figure 2:
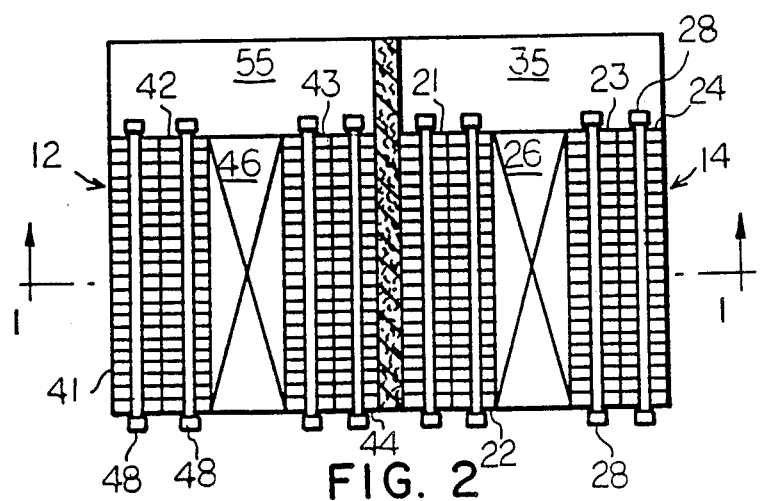
FIG. 2 is a diagrammatic top cross-section view of the complementary desiccant beds and bypass airways in the direction of the arrows on line A—A of the heat exchanging desiccant bed air conditioning system of FIG. 1.
Figure 3:
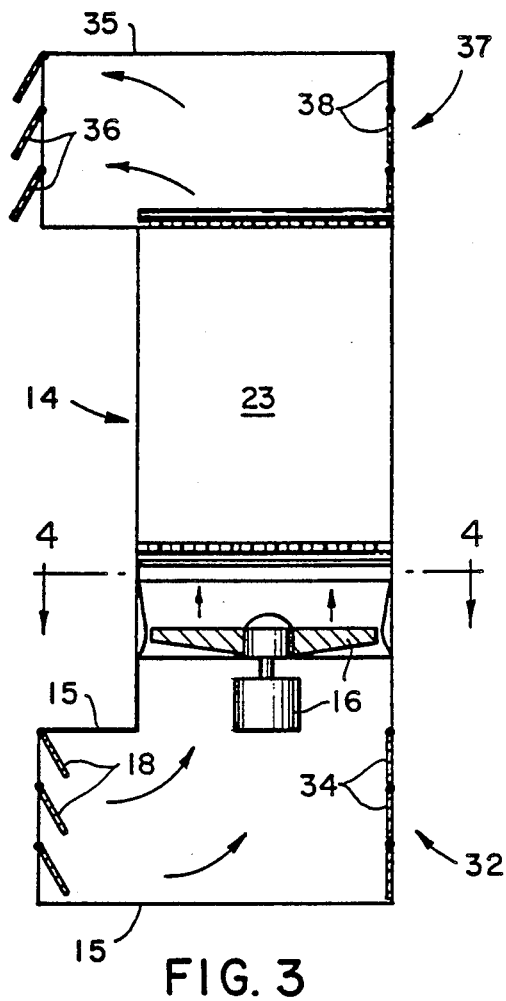
FIG. 3 is a diagrammatic side cross-section view of the heat pump desiccant bed air conditioning system in upright position and rotated 90° from the view of FIG. 1 in the direction of the arrows of line D—D of FIG. 4 and showing one of the desiccant bed modules operating in the absorption phase.
Figure 4:
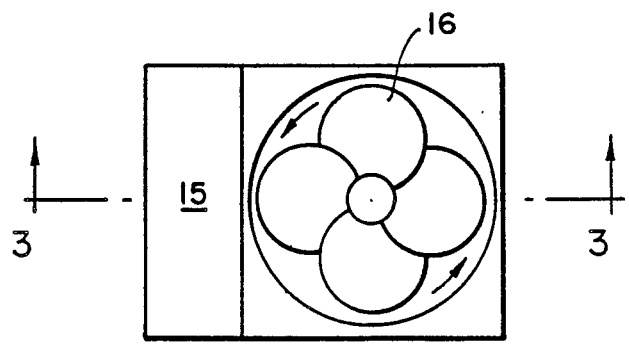
FIG. 4 is a diagrammatic cross-section view looking down on the fan of the desiccant bed of FIG. 3 in the direction of the arrows on line B—B of FIG. 3.

DETAILED DESCRIPTION OF PREFERRED EXAMPLE EMBODIMENTS AND BEST MODE OF THE INVENTION

A heat pump desiccant bed air conditioning system 10 composed of two reverse cycle complementary heat pump desiccant beds 12 and 14 for full-time operation is illustrated in FIGS. 1-4. FIGS. 1-4 illustrate the air flow and air passageway elements of the system for showing the desiccant bed cycle operation in the adsorption and desorption phases. FIGS. 7-10 described subsequently illustrate the refrigerant lines and circuits showing the coincident and complementary heat pump cycle operation in the evaporation add condensation phases. Referring to FIGS. 1-4, the desiccant bed unit 14 is shown operating in the adsorption phase, cycle, or mode, while the desiccant bed unit 12 is operating in the desorption cycle. Operation of the desiccant bed unit 14 in the adsorption phase is described with particular reference to FIGS. 1, 3, and 4.

During adsorption, warm, moist, house air is drawn into the desiccant bed unit 14 through the entrance duct 15 by a three-speed reversible fan and drive motor 16. The one-way shutters or louvers 18 open inwardly in the entrance duct 15 to admit the high humidity house air for adsorption. This air is drawn into the fan 16 and blown or pushed through desiccant bed modules 21, 22, 23, and 24 and also through a bypass duct 25 between the desiccant bed modules 22 and 23. A liquid-to-air heat exchanger 26 is positioned at the end of the bypass duct 25 for cooling the bypass air which is constrained to pass through the heat exchanger 26.

The silica gel bed modules 21, 22, 23, and 24 operate to dry the portions of air which flow through the modules. The desiccant bed modules 21-24 are constructed, for example, from tube fins, tube plates, or radiators all as hereafter described, defining air passageways in the elongate direction through the modules. Extended surface area desiccant material such as silica gel beads or granules are intimately bonded to the heat conducting surfaces of the fins, plates, or radiators by an adhesive bonding layer such as silicone rubber glue. The modules are constructed with refrigerant liquid or heat transfer liquid circulating tubes and channels on heat exchange relationship with the extended surface area desiccant material through the fins, plates, and radiators for export of heat energy from the desiccant bed during the adsorption phase and import of heat energy from external sources to the desiccant bed during the desorption phase as hereafter described. The refrigerant circulating tubes or tortuous channels through each of the desiccant bed modules is accessed through header pipes 28 which function either as inlet headers or outlet headers for the tubes or channels depending upon the phase in the cycle of operation.

The relative proportion of the inflowing warm and humid building air passing through the heat exchanging or heat pumping desiccant bed modules 21-24 for adsorption and drying of the air and the relative proportion of inflowing building air passing through the bypass air passageway 25 and air-to-liquid heat exchanger 26 for cooling the air is controlled by the rotatable vein or shutter 30. This relative proportion or ratio may be controlled to achieve the desired relative humidity and temperature of the combined air flows at the outlet to achieve desired air parameters in the comfort zone range. At the same time, outside air is prevented from being drawn in by the fan 16 through the exhaust air outlet 32 by one-way shutters or louvers 34 which are constrained so that they may open only in the outward direction.

Conditioned air exiting from the heat exchanging or heat pumping desiccant bed modules 21-24 and bypass air passageway 25 and heat exchanger 26 mixes in the conditioned air return duct or outlet 35 through one-way outlet louvers 36. From the return dutt and outlet 35 the conditioned air may be subjected to a further evaporative cooling step to achieve the final parameters in the comfort zone range before return to the building or house distribution air ducts. The conditioned air is prevented from exiting through the outside air inlet 37 by means of one-way louvers 38 which are oriented for opening only in the inward direction.

While condensation of moisture from humid building air on the desiccant material surfaces releases latent heat of condensation heating the desiccant bed from the outside surfaces, evaporation of refrigerant expanding in the refrigerant circulating tubes or channels in heat exchange relationship with the inside surfaces of the desiccant beds carries away latent heat of vaporization in the circulating refrigerant gas. At the same time sensible heat from the adsorbing air flow is transferred across the desiccant bed to the circulating refrigerant gas by the refrigerating action of the heat pump. Therefore both laten heat and sensible heat energy are transferred across the heat exchanging desiccant bed surfaces by the coincidence of adsorption and condensation of moisture on the outside surfaces of the desiccant bed modules in the air passageways and evaporation of refrigerant inside the refrigerant circulating tubes or channels of the desiccant bed modules. It is this synergistic coincidence and coaction of desiccant bed adsorption and heat pump evaporation which permits matching of latent heat and sensible heat energy flow across the heat exchanging desiccant bed surfaces referred to herein as "enthalpy matching". That is, both latent heat of condensation and sensible heat are transferred to the desiccant bed by moisture adsorbing and condensing on the outside of the desiccant material surfaces and adsorbing air flowing in the air passageways while both latent heat of vaporization and sensible heat are carried away from the desiccant bed by refrigerant gas expanding and evaporating in the refrigerant circulating tubes or channels. This "enthalpy pumping" or "enthalpy matching" resulting from the coincidence of adsorption and evaporation across the desiccant bed surfaces greatly enhances the efficiency of operation of the air conditioning system.

While the desiccant bed unit 14 is operating in the adsorbing or adsorption phase of the air conditioning cycle, desiccant bed unit 12 is being recharged in the desorption phase or desorbing mode of operation. A diagrammatic side cross-section through the center of desiccant bed unit 12 during the desorption phase is illustrated in FIG. 5. For desorption, evaporation, and removal of moisture from the extended desiccant material surfaces of the desiccant bed modules 41, 42, 43, and 44, the rotation of fan 20 is reversed so that outside air or air from an outside source such as hot attic air or solar heated air is drawn through the outside air entrance or inlet 57 through the one-way louvers or shutters 58. Building air is prevented from being drawn by the fan through the conditioned air outlet 55 by the one-way shutters or louvers 56 which are oriented for opening only in the outward direction. All of the desorbing air is constrained to pass through the desiccant bed modules 41-44 by closing the shutter 50 so that none of the air passes through the bypass air passageway 45 and liquid-to-air heat exchanger 46.

The construction of the air conditioning desiccant bed unit 12 is identical to that of the air conditioning desiccant bed unit 14 and desiccant bed module 41-44 are similarly heat exchanging or heat pumping desiccant beds composed of fins, plates, or radiators covered with extended surface area desiccant material with tortuous circulating tubes or channels for heat exchange fluid or refrigerant fluid accessed through the inlet and outlet headers 48.

The outside air or desorbing air passing through the desiccant beds 41-44 and laden with moisture and humidity desorbed or evaporated from the desiccant bed desiccant material surfaces is pushed, blown, or forced out of the system by the fan 20 through the exhaust air outlet 52 through the exhaust outlet one-way shutters or louvers 54. The 100% humidity moisture-laden air is prevented from entering the house or other building through the building air entrance duct or inlet duct 60 by the one-way louvers or shutters 62 which are constrained for opening only in the inward direction.

During the cycling operation of the parallel reversing cycle heat pump desiccant bed air conditioning system 10, the heat pumping, heat exchanging desiccant bed units 14 and 12 are operating alternatively in the adsorbing and desorbing operating modes. When one of the desiccant bed units, e.g., desiccant bed unit 14 is operating in the adsorption phase as a desiccant bed air conditioner, it is also functioning as the evaporator of a heat pump circuit as hereafter described. At the same time the other heat pumping, heat exchanging desiccant bed unit 12 is operating in the desorption phase recharging the desiccant bed while at the same time functioning as a condenser in the heat pump refrigeration circuit hereafter described. When the desiccant bed modules 21–24 of the desiccant bed unit 14 are saturated with moisture in excess of 40% by weight of the desiccant material of the desiccant bed modules, the system reverses and the desiccant bed unit 14 cycles through a desorption phase recharging the desiccant bed modules while at the same time functioning as a condenser in the refrigerant heat pump circuit. The system 10 is capable of full-time operation as an air conditioning system, however, because the desiccant bed unit 12 then cycles through the adsorption phase drying and conditioning the building air while at the same time functioning as an evaporator in the refrigerant heat pump circuit. The two reverse cycle parallel complementary desiccant bed units 12 and 14 of the system are separated by the partition 64 to isolate heat transfer between the parallel units.

As warm, moist house air passes through the desiccant bed modules 21–24 of desiccant bed unit 14 during the adsorption phase for drying the air, moisture condenses on the extended surface area of the silica gel granules releasing the latent heat of condensation which heats the silica gel bed. At the same time, refrigerant liquid such as Freon (TM) refrigerant expands and evaporates in the refrigerant tubes or channels of the desiccant bed modules absorbing or picking up latent heat of evaporation from the desiccant bed transferring the heat away in the refrigerant vapor through the headers 28 of the desiccant bed modules. As a result, greater condensation and greater moisture capacity is achieved at the surfaces of the desiccant material. The refrigerating effect of the desiccant bed modules functioning as an evaporator in the heat pump circuit also cools the air passing through the desiccant bed modules by removing and carrying away sensible heat. The heat exchanger 26 may be coupled in series with the desiccant bed modules 21–24 in the refrigerant line of the heat pump circuit upstream from the modules, therefore also functioning as an evaporator for refrigerating and cooling air passing through the bypass air passageway 25.

The heat exchanger 26 may also be reconfigured as a larger surface area heat exchanger 27 and also positioned upstream in the air flow from the desiccant bed modules 21–24, as illustrated in FIG. 6. An advantage of this configuration is that the liquid-to-air heat exchanger 27 functioning as a component of the evaporator of the heat pump circuit cools the warm humid air approaching the desiccant bed modules so that the building air approaches and reaches saturation as it is cooled by evaporation of the refrigerant in the circulating lines or channels of the heat exchanger 27. By this important expedient, removal of water vapor from the house air by condensation on the desiccant bed silica gel surfaces is maximized. By way of example, when the relative humidity of the building air entering the silica gel desiccant beds is increased to 100% relative humidity or saturation and beyond that to super-saturation, the silica gel beads or granules of the desiccant bed are capable of capturing, absorbing and condensing over 50% by weight of the water exceeding the 40% by weight capacity limit of the extended surface areas of the silica gel desiccant material. Thus, with super-saturation moisture and water vapor in the building air may be condensed over the outside of the silica gel beads or granules. At the same time, the desiccant bed modules functioning as evaporators carry away the heat of condensation in the vaporization or evaporation of the refrigerant in the circulating tubes or channels of the desiccant bed modules functioning as evaporators in the heat pump cycle.

In the desorption phase exemplified by heat pump desiccant bed unit 12 shown in FIGS. 1, 5, and 6, hot air drawn from an external source through the outside air inlet 57 and louvers 58 is constrained to pass through the air passageways of desiccant bed modules 41-44 with the rotating shutter 50 closed. The hot desorbing air may be derived for example from attic air or other solar heated air. Water from the moisture-laden and saturated desiccant material surfaces of the desiccant bed modules 41-44 evaporates into the desorbing air flow which subjects the desorbing modules to evaporative cooling, carrying away the heat of vaporization.

In the configuration of FIG. 6, a conventional liquid-to-air type heat exchanger 47 extends across the entire air passageway at the ends of the desiccant bed modules 41-44. During the desorption phase this conventional heat exchanger 47 is positioned at the downstream end of the desiccant bed modules and therefore does not perform any substantial additional function of transferring heat to the desorbing exhaust air. The circulating tubes or channels of the heat exchanger 47 are coupled in series in the refrigerant flow. According to an alternative example embodiment of the invention hereafter described, a conventional metal surface liquid-to-air heat exchanger similar to heat exchanger 47 may be placed upstream from the desiccant bed modules in the desorbing air flow for preheating the desorb air to increase the efficiency of desorption and evaporation of moisture from the desiccant bed for recharging the desiccant material surfaces.

At the same time, however, the modules are functioning as condensers in a heat pump circuit delivering latent heat of condensation from hot compressed refrigerant gas condensing in the refrigerant circulating tubes or channels of the heat exchanging desiccant bed modules 41-44. Transfer of latent heat of condensation from the refrigerant to the desiccant beds from the inside of the desiccant beds is therefore matched with transfer of latent heat of vaporization away from the outside surfaces of the desiccant bed by moisture evaporating into the desorbing air flow. Sensible heat is also transferred across the desiccant bed from the hot refrigerant liquid to the desorbing air flow. There is thus total enthalpy transfer across the heat exchanging desiccant bed surfaces with "enthalpy matching" in the transfer of both latent heat and sensible heat on both sides of the desiccant bed heat exchanging surfaces by reason of the complementary coincidence of desorption on one side in the air passageways and condensation on the other side in the refrigerant circulating channels as hereafter described. It is this synergistic coincidence and coaction of desorption and condensation which permits the transfer of both latent heat and sensible heat energy across the heat pumping, heat exchanging, desiccant bed surfaces. This delivery of latent heat and sensible heat energy to the desiccant bed by condensation on one side and the carrying away of both latent heat energy and sensible energy by desorption on the other side is referred to herein as "enthalpy matching".

Figure 7:
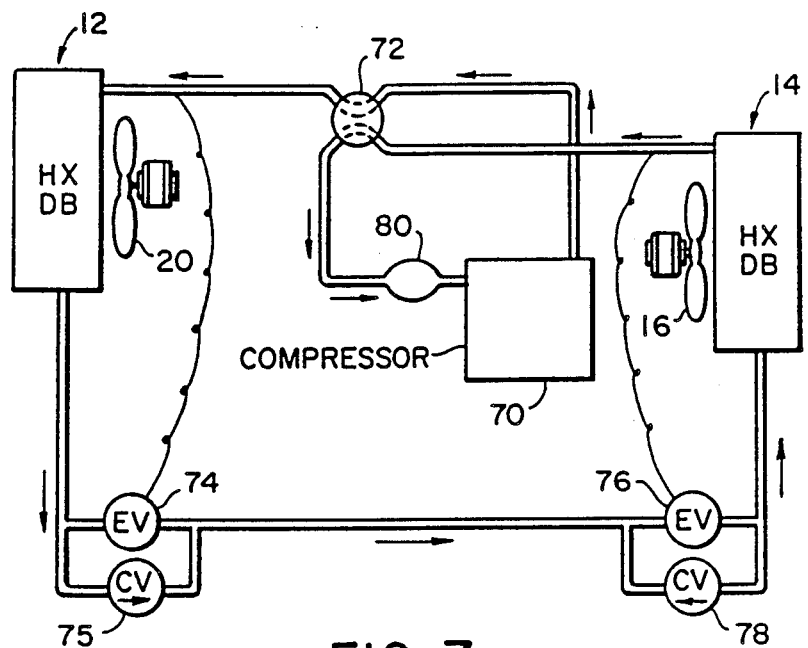
FIGS. 7 and 8 are simplified or generalized schematic diagrams of the refrigerant circulating line of the heat pump desiccant bed air conditioning system of the invention operating respectively in the evaporation and condensation cycles, phases, or modes.
Figure 8:
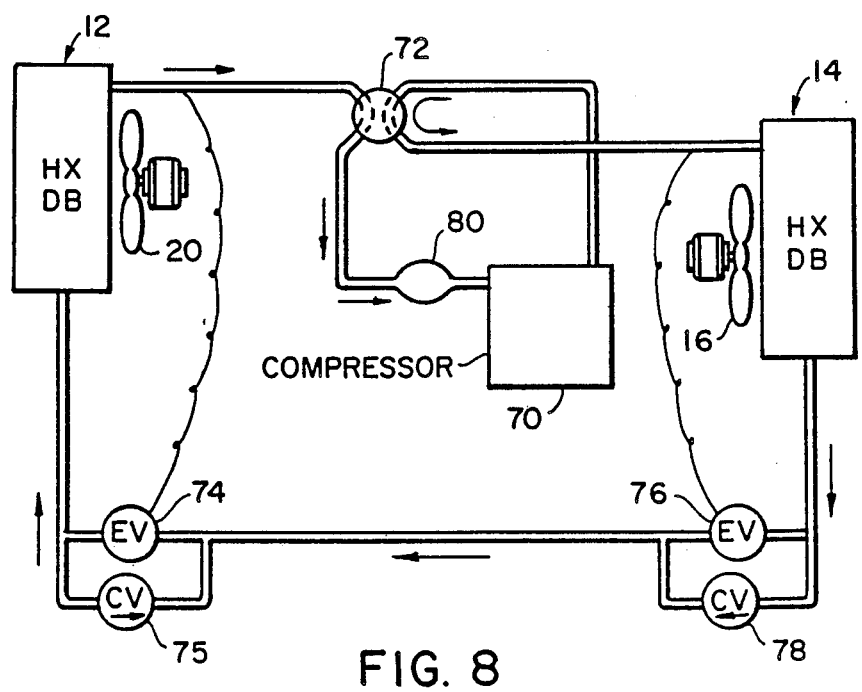

Simplified diagrams of the heat pump cycle showing the refrigerant circuit and refrigerant line flow during reverse cycle operation are shown in FIGS. 7 and 8. The heat exchanging desiccant bed units 12 and 14 with respective fans 20 and 16 are showing simplified block diagram form and the heat pump cycle corresponding to FIG. 1 is illustrated in FIG. 7. In this cycle, heat exchanging desiccant bed unit 14 is operating in the adsorption phase in the air conditioning passageways and as an evaporator in the heat pump refrigerant line. On the other hand, heat exchanging desiccant bed unit 12 is operating in the desorption mode in the air conditioning air passageways while functioning as a condenser in the refrigerant circulating line of the heat pump. Referring to FIG. 7, the compressor 70 delivers hot compressed refrigerant gas such as Freon (TM) gas at a temperature in the range of, for example, 200°-250° F. (93°-121° C.) and a pressure in the range reversing valve 72 to the refrigerant circulating tubes or channels through desiccant bed unit 12 operating in the desorption phase and functioning as a condenser in this heat pump cycle. Passing through the heat exchanging desiccant bed unit 12 the hot refrigerant gas condenses giving up latent heat of condensation and sensible heat energy to moisture on the desiccant material surfaces evaporating into the desorb air flow. The condensed liquid refrigerant still on the high pressure side of compressor 70 passes out of the condenser heat exchanging desiccant bed 12 at a temperature in the range of, for example, 90°-120° F. (32°-49° C.) and bypasses the reverse cycle metering device or expansion valve 74 through one-way check valve 75. The expansion valve 74 can pass liquid refrigerant in only one direction and operates as the metering device or expansion valve during the reverse cycle hereafter described with respect to FIG. 8. The one-way operation of expansion valve 74 may be controlled by a thermostat associated with the input line to desiccant bed unit 12.

The passage of refrigerant through the condenser desiccant bed unit 12 lowers the temperature below the triple point of Freon (TM) with the transition from the gaseous phase to liquid phase typically at 120° F. (49° C.). The drop in temperature of the refrigerant from 200°-250° F. (93°-121° C.) to 100°-120° F. (38°-49° C.) represents the typical 30% loss in energy during cooling operation of a conventional heat pump refrigeration system. According to the present invention this energy difference is substantially entirely utilized for recharging the desiccant bed by desorption for use in drying, cooling, and conditioning the building air during the adsorption air conditioning phase when the heat exchanging desiccant bed unit also functions as an evaporator in the heat pump circuit. The coacting coincidence and synergism of the desiccant bed air conditioning phases of adsorption and desorption with the heat pump cycles of evaporation and condensation according to the present invention therefore affords an increase in efficiency of substantially 30% over conventional reverse cycle heat pump systems.

Referring again to FIG. 7, the condensed liquid refrigerant at a temperature in the range of, for example, 100°-120° F. (38°-49° C.) is metered, sprayed, and expanded through the heat pump cooling or evaporating cycle metering device or expansion valve 76 into the refrigerant circulating tubes or channels of heat exchanging desiccant bed unit 14 which is operating in the adsorption phase in the air conditioning air passageways and functioning as an evaporator in the heat pump circuit. One-way check valve 78 constrains the condensed liquid refrigerant to flow during the forward cycle or first cycle through the expansion valve 76. As the refrigerant expands and evaporates through the channels of desiccant bed unit 14 it cools the desiccant bed carrying away, in the latent heat of vaporization and sensible heat of the refrigerant gas, the latent heat of condensation of moisture adsorbed from humid building air on the desiccant bed desiccant material surfaces and sensible heat from the air passing through the air passageways of heat exchange desiccant bed unit 14. Upon passing through the metering device or expansion valve 76 and heat exchanging desiccant bed unit 14 functioning as an evaporator, the refrigerant gas, for example Freon (TM) gas, is typically at a temperature of 50°-60° F. (10°-15° C.) and at a pressure of 50-60 psi (3.6-4.3 kgs/cm). The refrigerant then passes through four-way reversing valve 72 through the accumulator 80 and back into the compressor 70. Accumulator 80 serves to trap any remaining liquid refrigerant so that only refrigerant gas or vapor re-enters the compressor 70.

For operation of the heat pump circuit of FIG. 7 according to the desiccant bed configuration of FIG. 6, a conventional metal surface liquid-to-air type heat exchanger 27 of FIG. 6 would be interposed on the evaporator side of the refrigerant line, for example upstream from the heat exchanging desiccant bed 14 for pre-cooling building air before it enters the air passageways of desiccant bed unit 14. Such pre-cooling of the building air has the advantage as previously described of increasing the relative humidity of the air and therefore increasing the adsorption and condensation of moisture from the air on the desiccant material surfaces of desiccant bed unit 14. Similarly, a conventional metal surface liquid-to-air type heat exchanger may be placed upstream on the condenser side of the heat pump upstream in the refrigerant line from the heat exchanging desiccant bed 12 for preheating desorption air passing through the air passageways of desiccant bed unit 12 for greater desorption and evaporation of moisture from the desiccant material surfaces during recharging of desiccant bed unit 12.

The reverse cycle heat pump operation is illustrated in FIG. 8. When the desiccant material surfaces of desiccant bed unit 14 have been saturated during the adsorption phase, four-way reversing valve 72 is actuated and rotated so that heat exchanging desiccant bed 12 operates in the evaporation cycle or phase while desiccant bed unit 14 is recharging. At the same time that reversing valve 72 is actuated the reversing fans 16 and 20 are reversed for reversing the adsorption and desorption phases of the desiccant bed air passageways as described with reference to FIGS. 1-6.

The provision of two parallel complementary heat exchanging desiccant bed units 12 and 14 with reversing fans and reverse cycle operation in the adsorption and desorption phases in a heat pump circuit with the desiccant beds coinciding with the evaporator and condenser of the heat pump circuit capable of reverse cycle operation in evaporation and condensation phases coincident with the adsorption and desorption phases, the heat pump desiccant bed air conditioning system is capable of full-time operation with one side of the system always conditioning building air while the other side of the system is recharging.

The reverse cycle capability further permits substantially complete utilization of the system energy without the 30% loss of system energy normally experienced by conventional heat pump systems by utilizing what would ordinarily be waste heat energy for recharging one side of the system while the other side is air conditioning. The two complementary sides of the heat pump desiccant bed air conditioning system cycle back and forth between the coincident adsorption and evaporation phases on the one hand and the desorption and condensation phases on the other hand.

Figure 9:
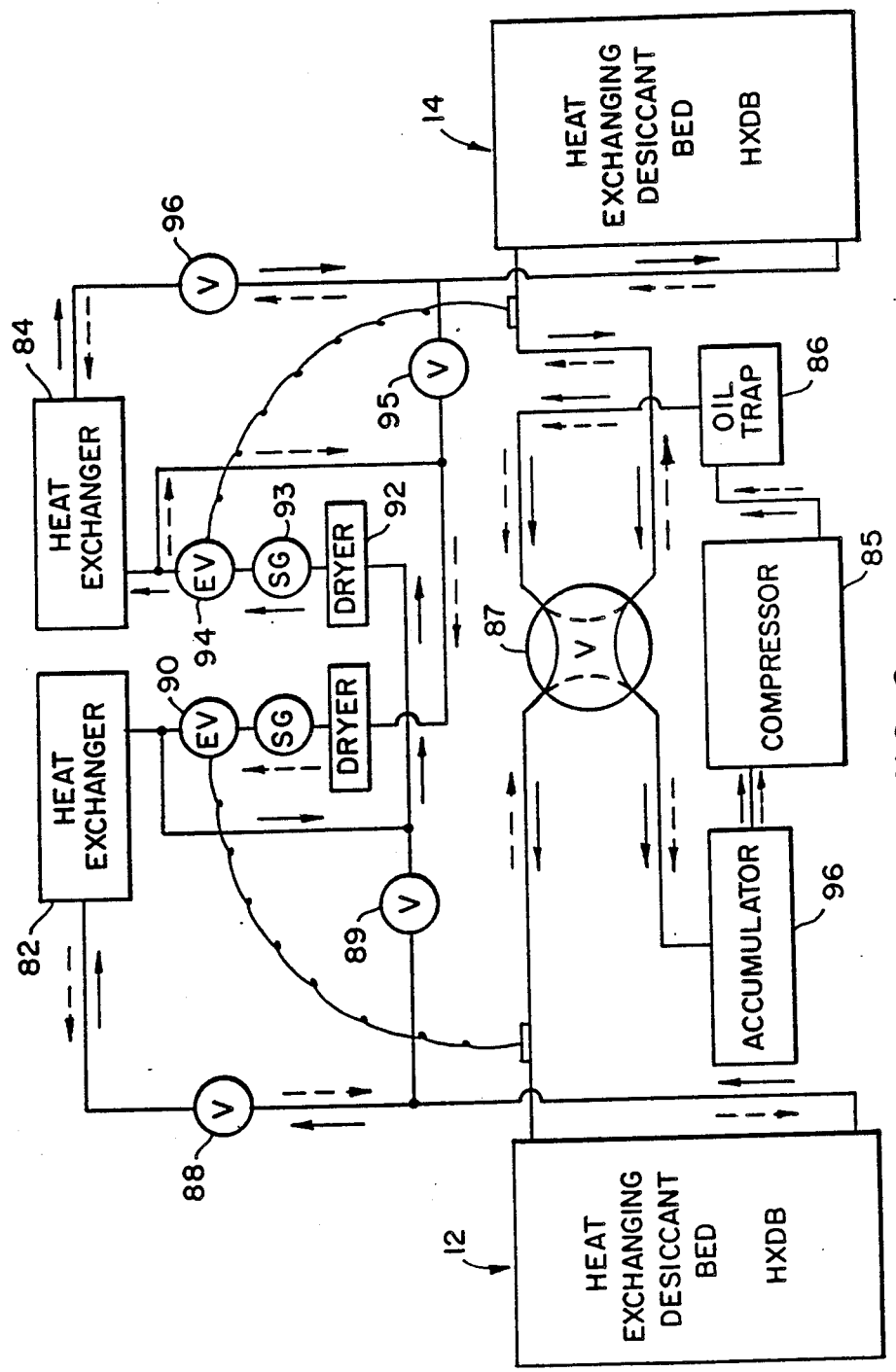
FIG. 9 is a detailed schematic diagram of a refrigerant circulating line for another heat pump desiccant bed air conditioning system.

A more detailed system diagram of an alternative arrangement for the heat pump desiccant bed air conditioning system showing the heat pump refrigerant circuit is illustrated in FIG. 9. In this diagram the solid arrows represent the refrigerant flow during the cycle of operation when heat exchanging desiccant bed unit 14 is operating in the adsorption phase in the air conditioning air flow and functioning as an evaporator in the refrigerant line while heat exchanging desiccant bed unit 12 is operating in the desorption phase in the air conditioning air flow while functioning as a condenser in the refrigerant line thereby corresponding to the cycle of operation illustrated in FIGS. 1 and 7. The reverse cycle operation corresponding to FIG. 8 is shown in dashed arrows.

However in the system of FIG. 9 conventional metal surface liquid-to-air type heat exchangers 82 and 84 have been positioned in the air conditioning air flow upstream from the respective heat exchanging desiccant beds 12 and 14. On the other hand in the refrigerant circulating line the heat exchangers (HX) 82 and 84 are upstream in the refrigerant circulating line from the respective heat exchanging desiccant beds (HX) 12, 14 when the HX is functioning as an evaporator, and downstream in the refrigerant circulating line when the respective HX is functioning as a condenser.

Referring to FIG. 9 and the cycle of operation represented by solid arrows, the compressor 85 forces high temperature and pressure refrigerant vapor or gas such as Freon (TM) vapor for example at 250° F. (121° C.) and 300 psi (21 kgs/cm) through oil trap 86 and reversing 4 way valve 87 in the channel direction represented by solid lines through the 4 way valve 87. The hot pressurized refrigerant vapor flows into the circulating tubes or channels of desiccant bed unit 12 functioning as a condenser in the refrigerant circulating line while desorbing its desiccant bed desiccant materials surfaces in the exhaust air passageway.

The high pressure Freon (TM) refrigerant exits the circulating channels of desiccant bed 12 partially condensed liquid and partially vapor at a temperature for example 120° F. (49° C.) and pressure of 300 psi (21 kgs/cm) and approaches the on/off valves 88 and 89. In this cycle of operation valve 89 is closed and valve 88 is open passing the hot refrigerant through conventional heat exchanger 82 which serves to preheat the desorbing exhaust air passing through the air passageways of desiccant bed unit 12. For example desorb air entering heat exchanger 82 at a temperature in the range of for example 85°-90° F. (29°-32° C.) is preheated by the 120° F. (49° C.)Freon (TM) refrigerant and at the same time the condensation of refrigerant to liquid at a temperature for example 100° F. (38° C.) is complete.

The system components are configured so that the refrigerant enters the top of heat exchanger 82 and the fully condensed liquid exits at the bottom. The liquid refrigerant cannot pass through expansion valve 90 and therefore by passes around to dryer 92 for removal of water, site glass 93 to expansion valve 94. At expansion valve 94 the liquid refrigerant is released and expanded into the low pressure side of the refrigerant circuit. During this cycle of operation on/off valve 95 is closed and valve 96 is open so that the refrigerant flows partially expanding into the bottom of heat exchanger 84 at a temperature for example 45° F. (7° C.) at a pressure of 60 psi (4.3 kgs/cm). Heat exchanger 84 which is positioned upstream in the air conditioning air flow through desiccant bed unit 14 pre-cools the warm building air to increase its relative humidity and thereby increase the adsorption of moisture on the desiccant material surfaces of heat exchanging desiccant bed 14. Because the refrigerant picks up heat in heat exchanger 84 it exits the top of heat exchanger 84 at a temperature for example 50° F. (10° C.) and 50 psi (3.6 kgs/cm).

The refrigerant then flows into the bottom of HXDB 14 expanding into the circulating tubes or channels cooling the desiccant bed desiccant material surfaces as it evaporates thereby carrying away the latent heat of condensation from moisture adsorbing on the desiccant material surfaces exposed to the air passageways. Sensible heat is also transferred to the refrigerant across the heat exchanging desiccant bed from building air flowing in the HXDB air passageways. The vaporized refrigerant leaves the top of HXDB 14 at a temperature in the range of 55°-60° F. (12.8°-15° C.) and pressure of 50 psi (3.6 kgs/cm) for return through four-way reversing valve 87 to accumulator 96. Any liquid refrigerant is trapped in accumulator 96 for revaporization before return to the inlet of compressor 85 for recycling.

When the desiccant material surfaces of the desiccant bed modules in HXDB 14 have adsorbed moisture to their full capacity (e.g. 40% by weight of silica gel granules or beads) the reverse cycle is initiated. A humidity sensor in the building air flow at the outlet of the HXDB may be used for this purpose. To reverse the cycle of operation the four way reserving valve 87 is changed manually or automatically in response to a humidistat so that the Freon (TM) or other refrigerant flow follows the paths of the dash lines in valve 87. The refrigerant circulation then follows the path of the dashed arrows so that the system operates identically in reverse with HXDB 14 functioning as a condenser in the heat pump circuit while HXDB 12 functions as an evaporator. At the same time the reversing fans 16 and 20 in the air flow and corresponding shutters and louvers are reserved so that the HXDB 12 operates in the adsorption phase adsorbing moisture from humid building air, while HXDB 14 is recharging and desorbing moisture from the desiccant material surfaces into an exhaust air flow.

Figure 10:
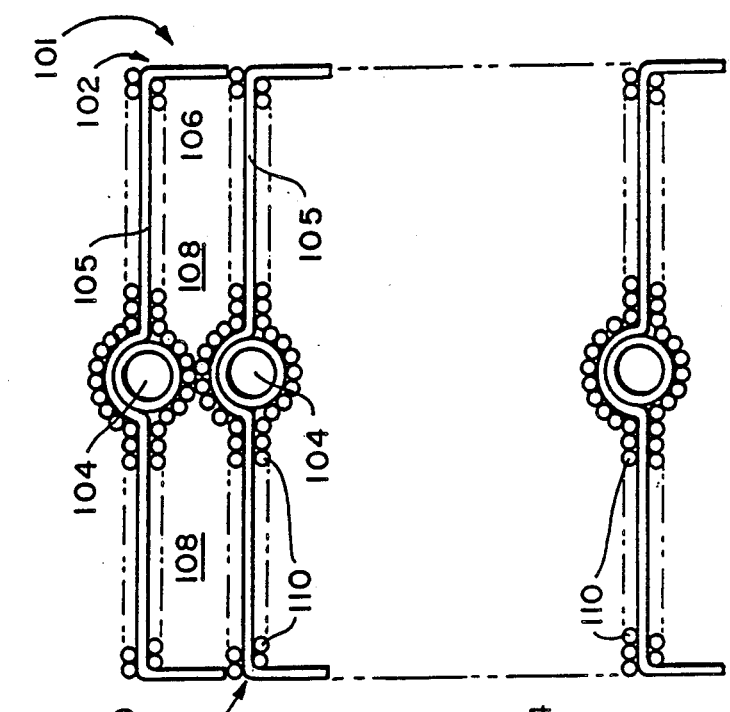

One construction arrangement for the desiccant bed modules 21 through 24 and 41 through 44 is illustrated in FIGS. 10 and 10A as set forth in applicants co-pending U.S. patent application Ser. No. 750,932 for DESICCANT SOLAR AIR CONDITIONING SYSTEM filed July 1, 1985. According to this embodiment, each desiccant bed module 101 is formed by a stack of side-by-side two sheets or tube fins 102. Each tube fin comprises a liquid coolant or refrigerant circulating tube or channel 104 of liquid confining thermally conducting material such as copper. A fin 105 of heat conducting metal such as aluminum is soldered, welded or otherwise intimately bonded to the tub 104 for good thermal conductivity. The ends of fins 105 are folded over providing spacers 96 for spacing the tub plates or tub pins in substantially parallel relationship from each other and for defining the air passageways 108 between the fins 105. The substantially equal spacing of the tub fins 102 and fins or plates 105 substantially equalizes the pressure gradient over the desiccant bed for equalizing flow of air through the bed during the adsorb and desorb cycle.

The desiccant material and extended desiccant surface area throughout the desiccant bed of the module is provided by silica gel granules such as commercial silica gel, for example in the form of spheres 110 intimately contacting and bonded over the surfaces of the tube fins 102. For adhesive bonding of the silica gel spheres 110 to the surfaces of the tubes 104 and fins or plates 105, a thin layer of an adhesive bonding glue which also forms a good heat conducting layer is applied over the surfaces of the circulating tube 104 and fins or plates 105. An adhesive bonding material or glue such as silicone rubber glue provides the advantages of intimate bonding and good thermal conductivity. To enhance the thermal conductivity of the adhesive layer, metal particle filler may be added to the silicone rubber glue or other glue. Such metal particle fillers may also be incorporated in the silica gel to improve thermal conductivity. The silica gel spheres 110 are then spread over the surface and pressed through the layer of silicone rubber glue until they actually touch the aluminum fins or plates 105 and tube 104. An advantage of using aluminum for the fins, sheets or plates 105 is that the pores in aluminum facilitate adhesive bonding.

While the preferred example embodiment is described with reference to silica gel spheres, other granule size forms of silica gel such as crushed pieces, pellets, etc. may also be used but in the preferred granular size range greater then power size, that is, in the mesh size greater than U.S. or Tyler Standard Mesh Size 50 and preferably from mesh size, for example, 20 up to mesh size 4 and greater. Thus, the diameter of the granules, pieces, pellets or spheres is in the optimum range of for example 132 inch to ¼ inch (0.08 to 0.65 cm). While silica gel is the preferred desiccant material other desiccants may also be used such as activated alumina or aluminum oxide and zeolite. Other construction details and features are set forth in applicant's co-pending patent application Ser. No. 750,932 referred to above.

Other parallel plate structures with heat conducting surfaces and circulating tubes or channels may also be used for in the construction of the desiccant bed modules such as for example tube sheets and radiators. Tube sheets are two sheets of metal, welded, bonded, or laminated together with air space channels between the sheets defining liquid circulating channels. Radiators of course provide tortuous liquid circulating tubes or channels with parallel radiator fins extending from the tubes or channels such as in an automobile radiator. The radiator fins or tube sheets are then coated with a layer of granular silica gel as defined above. It is advantageous in the structure of the desiccant bed modules to incorporate liquid coolant or refrigerant circulating tubes and channels which are tortuous, folding back on themselves to provide extended passes through the desiccant bed module in heat exchange relationship with the fins, plates, or radiators for complete evaporation or condensation of refrigerant circulating through the desiccant bed modules.

One method for mass producing the desiccant bed module of silica gel granules on such radiator structures or on stacked tube fins or tube sheets is to spray silicone rubber glue over the heat transfer surfaces to be coated and then role silica gel beads over each other onto the layer of silicone rubber glue until it is fully covered with granular silica gel. Thus, the silica gel beads are poured into the slots between the radiator fins after spraying with the desired layer of silicone rubber glue A suitable radiator structure for coating in this manner and use in the desiccant bed module is for example and automobile transmission cooler type radiator. Generally it is desirable to use such a radiator structure with radiator fin spacing of ½ inch (1.3 cm) to accommodate silica gel beads or other desiccant beads in the order of ⅛ inch (0.3 cm) on each surface while still leaving a ¼ inch (0.6 cm) air passageway gap between each of pair of desiccant granule coated radiator fins.

Typically the size of each of the desiccant bed modules 21 through 24 and 41 through 44 using stacked tube fins or tube sheets is approximately 4 inches (10 cm) wide with a height and width of length of approximately 22 inches (56 cm) by 20 inches (51 cm) or approximately 2 feet by 2 feet (61 cm by 61 cm). Typical automobile type radiators for use in the desiccant bed modules typically range in size from 2 to 4 inches (5 to 10 cm) thick with a height and length of width of 16 by 16 inches (41 by 41 cm).

Figure 11:
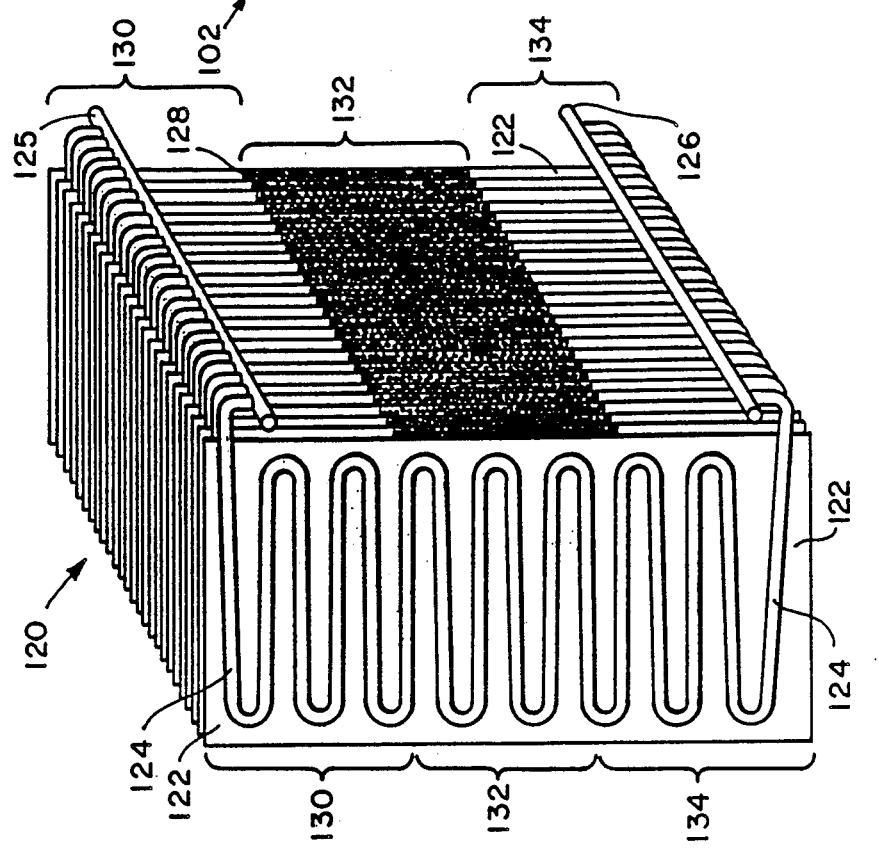
FIG. 11 is a diagrammatic perspective view of an elongate multiple element or multiple stage heat exchanger structure according to the invention incorporating both conventional metal surface heat exchangers and a heat exchanging desiccant bed in a unitary "banded" (HX/DB/HX) structure.

A new integrated heat exchanger desiccant bed structure according to the present invention is illustrated in FIG. 11. This new integrated heat exchanging desiccant bed structure example illustrated in FIG. 11 is dimension to replace, for example four of the desiccant bed modules such as 21 through 24 of FIG. 1. At the same time the integrated heat exchanger of FIG. 11 incorporates conventional metal surface liquid-to-air type heat exchangers with a desiccant bed heat exchanger in an alternating band construction. The integrated heat exchanger desiccant bed 120 is formed by a stack of tube sheets or folded tube fins each formed with a tortuous or serpentine liquid coolant or refrigerant circulating channel 124 which folds back on itself many times between the inlet and outlet header pipes conduit 125 and 126 at each end of the integrated bed. While the width and length of the bed is approximately 16 by 16 inches (41 by 41 cm), the height of the integrated bed provides the elongate dimension of approximately 32 inches (81 cm) and the air flows for adsorption and desorption are directed through the integrated bed in this elongate direction. Thus the refrigerant or liquid coolant flows in the serpentine channels 124 is generally perpendicular to the air flow through the elongate dimension of the desiccant bed.

As illustrated in FIG. 11 only a central band or portion of the integrated structure is coated with desiccant materials such as silica gel granules 128 to provide a central heat exchanging desiccant bed bans or portion 132 sandwiched between two uncoated metal surface portions constituting outer conventional heat exchanger bands or portions 130 and 134. The single integrated heat exchanger desiccant bed structure referred to herein by the symbol designation HX/DB/HX incorporates conventional liquid-to-air type heat exchangers 130 and 134 on either side of the heat exchanging desiccant bed 132 that is both upstream and downstream relative to the desiccant bed in the air conditioning adsorption air flow and the recharging desorption air flow. Furthermore, the conventional heat exchanger bands 130 and 134 further constitute conventional evaporator and condenser elements on either side of the heat exchanging desiccant bed evaporator or condenser element in the refrigerant circulating line. This affords a number of advantages when the integrated heat exchanging desiccant bed structure 120 is incorporated in air conditioning systems of the type described for example with reference to FIGS. 1 and 6. In effect the conventional heat exchangers 26 and 46 of FIG. 1 and 27 and 47 of FIG. 6 have been incorporated as integral elements of the unitary heat exchanging bed structure.

The integrated unitary heat exchanging desiccant bed structure HX/DB/HX of FIG. 11 is incorporated in the air conditioning system with the air flows either desorption or adsorption passing through the HX/DB/HX structure in the elongate direction. Furthermore, the headers 125 and 126 of the serpentine refrigerant circulating channels are coupled into the heat pump refrigerant circuit in the manner described with reference to FIGS. 7, 8 and 9. With the HX/DB/HX bed 120 functioning as an evaporator in the heat pump circuit and functioning to adsorb and condition building air in the air flow, moist building air is first pre-cooled in the conventional heat exchanger band 130 lowering the temperature of the in flowing air so that it approaches 100% relative humidity or super-saturation. Moisture is adsorbed or condensed from the building air as it then passes through the desiccant bed band 132 releasing the latent heat of condensation. The latent heat of condensation is carried away by latent heat of evaporation of refrigerant passing through the serpentine or tortuous refrigerant circulating channels 124. Finally sensible heat is removed from the dried building air as it passes through the final conventional heat exchanger band or portion 134 before exiting to the building air duct. Throughout the adsorption phase, the integrated heat exchanging desiccant bed 120 is functioning as an evaporator in the heat pump circuit with conventional heat exchanger bands 130 and 134 functioning as conventional evaporator elements while the desiccant bed band 132 functions as a novel enthalpic heat pump evaporator element because of the matching and complementary latent heat and sensible heat processes taking place on either side of the desiccant bed surfaces. Thus in the central desiccant bed band 132 latent heat of condensation is given up on the desiccant material surfaces by condensing and adsorbing moisture while latent heat of vaporization is carried away by expansion and evaporation of refrigerant inside the refrigerant circulating channels 124 in heat exchange relationship with the desiccant bed surfaces. At the same time sensible heat is also transferred across the surfaces for total enthalpy impedance matching in both latent and sensible heat transfer.

During the reverse cycle or recharging operation of the integrated bed 120 after the desiccant material surfaces are saturated to capacity with water, desorb air enters one end of the elongate integrated unit such as for example attic air or solar heated air and is preheated as it passes through the first conventional heat exchanger band for example band 134. The recharging desorb air is preheated by the hot pressurized refrigerant gas as both the desorb air and refrigerant pass through the conventional heat exchanger band or element 134. Preheating lowers the relative humidity of the recharging air for evaporation of moisture from the desiccant material surfaces of the desiccant bed band 132. Latent heat of vaporization for desorbing moisture from the desiccant bed band 132 is provided by the latent heat of condensation of hot refrigerant gas condensing in the refrigerant circulating channels 124 passing through the central band 132 of the integrated bed. Finally the exhaust air laden with moisture from the desiccant bed band 132 passes through the final conventional heat exchanger band 130 for venting to the outside. In the final conventional heat exchanger band 130 some additional sensible heat may be given up by the refrigerant circulating in the refrigerant lines 124 to the exhaust air which undergoes some evaporative cooling in the desiccant band 132.

By way of example the integrated desiccant bed unit 120 is represented by the symbolism HX1DDB/HX2 for description of operating examples during the reverse cycle or condensation/desorption phase. Referring first to the heat pump circuit refrigerant flow, hot refrigerant gas at 200° F. (93° C.) passes through the HX1 band preheating the recharging desorb air giving up sensible heat to the air and cooling the refrigerant. The Freon (TM) refrigerant then enters the DB band at approximately 160° F. (71° C.) undergoing condensation and rapid cooling in the central desiccant bed band while moisture evaporates from the desiccant bed surfaces into the desorb air. Thus while the band DB is wet and laden with moisture for enthalpic heat transfer of both latent and sensible heat across the surfaces of the central band DB the refrigerant leaves the band DB and enters the portions of the refrigerant circulating channels in HX2 at approximately 105° F. (41° C.). While band HX2 is primarily inactive during the reverse cycle or condensation/desorption phase of operation there is some further transfer of sensible heat from the refrigerant to the exhaust air so that the refrigerant exits from the integrated HX1/DB/HX2 unit 120 at a temperature in the range of for example 100°–105° F. (38°–41° C.) and typically 102° F. (39° C.).

At the same time recharging or desorb air entering the air passageways of HX1 at for example 90° F. (32° C.) is preheated by the Freon (TM) refrigerant to for example 120° F. (49° C.) as it enters the air passageways of the central band DB. In desorbing moisture from the desiccant bed surfaces, the recharging air is subject to some evaporative cooling, emerges from the central portion DB at a temperature of approximately 100°–105° F. (38°–41° C.), and exits from the final heat exchanger band HX2 which is primarily inactive during the condensation/desorption phase, within the same temperature range. While the desiccant bed band DB remains laden with moisture during recharging the latent heat of vaporization of the desorb moisture is matched and supplied by the latent heat of condensation of refrigerant circulating in the channels 124 at the same time that sensible heat energy is also transferred across the surfaces of the desiccant bed band DB. It is this matching and transfer of both latent and sensible heat energy that is referred to herein as enthalpic impedance matching and enthalpic heat pumping and heat transfer which greatly increases the efficiency of heat pump desiccant bed air conditioning system of the present invention.

After the desiccant bed band DB has dried, during the reverse cycle or condensation/desorption phase of operation, the enthalpic heat energy transfer and matching ceases and the entire integrated HX/DB/HX sandwich structure functions as a conventional liquid-to-air type heat exchanger. This is because while the refrigerant gas undergoing condensation to the liquid state gives up heat of condensation to the surfaces of the heat exchanger desiccant bed structure, there is no latent heat of vaporization from moisture on the desiccant material surfaces to carry away the latent heat of condensation from the refrigerant. As a result all of the heat given up by the refrigerant both latent and sensible heat must by converted to sensible heat of the exhaust air passing through the air passageways. By way of example, the desiccant bed band DB dry desorb air enters the first heat exchanger band HX1 at a temperature for example 90° F. (32° C.) and is preheated passing through the first band HX1 to a temperature of for example 120° F. (49° C.). Passing through the central desiccant bed band DB the exhaust air continues to pick up heat from the condensing refrigerant in the form of sensible heating of the air emerging from the central band DB at a temperature of for example 130° F. (54° C.). The air remains approximately at the same elevated temperature exiting the final heat exchanger band HX2. At the same time the effect on the refrigerant with the desiccant bed band DB dry is as follows. Hot pressurized refrigerant vapor, for example Freon (TM) vapor enters the circulating channels of the first heat exchanger band HX1 at temperature of 200° F. (93° C.) giving up heat to the exhaust air and entering the central desiccant bed band DB at a temperature of for example 160° F. (71° C.). In this example with desiccant bed DB dry the central band DB functions as a conventional heat exchanger able to carry away heat from the refrigerant only in the more limited form of sensible heating of the air temperature and the refrigerant emerges from the central band DB at a temperature for example 140°–150° F. (60°–66° C.). It is in this example that the final heat exchange band HX2 performs an active condensing function in further cooling the refrigerant to the condensation temperature range.

The stacked tube plates of the integrated HX/DB/HX bed of FIG. 11 can be manufactured or formed in a variety of ways. According to one method, tube fins of the type illustrated in FIG. 10 are simply folded back and forth with sections of the fins removed at the turns so that the fins abut against each other and form a substantially continuous plate joined by the serpentine tube or channel as illustrated in FIG. 11. According to another method the tube plates of FIG. 11 are manufactured in the same manner as tube sheets in which flat pieces of metal are bonded together leaving an unbonded tortuous or serpentine strip which is inflated at for example 400 psi (28.6 kgs/cm) to form the sealed internal tube or channel between the flat parallel bonded plates. The tubes are approximately ¼ to ⅜ inch (0.6 to 1 cm) in diameter and the tube plates are stacked with approximately a ¼ inch (0.6 cm) gap between the tubes. In the example of FIG. 11 approximately 25 plates 32 inches (81 cm) in height and 16 inches (41 cm) wide are stacked to provide the integrated bed. Before the plates are stacked the silicone rubber glue is spread over approximately the middle third of the plates on both sides and the desiccant material such as silica gel granules are spread over and pressed into the bonding layer of glue.

The invention also contemplates a number of variations in the desiccant bed structures to enhance heat transfer across the desiccant bed surfaces. For example with desiccant bed modules of the type illustrated in FIG. 10 some of the surfaces may be left uncoated. Thus every other tube fin may be left uncoated by desiccant material exposing the metal surfaces for greater heat transfer and heat conductivity. Alternatively one side of the tube fins may be left exposed or one side of alternative tube fins may be left exposed for direct metal to air contact. Similarly in the integrated HX/DB/HX heat exchangers, some of the surfaces of the central band DB may be left uncoated with desiccant material to expose metal surfaces to air flowing through the air passageways. Another expedient is to mix metal particles or pieces with the desiccant bed material to enhance heat transfer across the layer of desiccant material. The stacked tube sheets, tube plates and tube fins can be made removal and replaceable for varying the area of desiccant material surfaces or the area of exposed metal surfaces according to the application such as summer cooling or winter heating. For example for winter heating applications it may be desirable to minimize or eliminate the desiccant material surfaces for maximizing heat transfer and delivery of heat from heat transfer liquid circulating in the channels or tubes. On the other hand for summer cooling it may be desirable to maximize the desiccant bed desiccant material surface area.

The invention contemplates a variety of permutations and combinations of the adsorb and desorb desiccant bed elements and the evaporator and condenser elements of the heat pump. The invention also contemplates various combinations of the foregoing identified elements with non-change of phase heat transfer liquid circulating heat exchanging desiccant bed elements of the type described in applicant's co-pending patent application Ser. No. 750,932 referred to above. For example, according to the present invention the evaporator of the heat pump desiccant bed air conditioning system may comprise two elements with separate parallel circulating lines. One element is a conventional meta surface liquid-to-air type heat exchanger which functions as an evaporator element having change of phase refrigerant such as Freon (TM) flowing through it while the heat exchanging desiccant bed comprises an evaporator element having non-change of phase heat transfer liquid such as liquid circulating through it. The two evaporator elements are placed in series in the air conditioning building air flow with the conventional heat exchanger upstream in the air flow from the heat exchanging desiccant bed for pre-cooling moist building air before it passes through the desiccant bed. The refrigerant circuit for the conventional heat exchanger evaporator element is of the type described, for example, with reference to FIGS. 7, 8, and 9 while the non-change of phase heat transfer liquid circulating system is of the type described in U.S. Ser. No. 750,932.

The invention also contemplates split unit air conditioners combining a heat pump with a conventional heat exchanger evaporator inside the house for cooling the house air and a pair of heat exchanging desiccant beds performing the condenser function outside the house. In this arrangement, one of the pair of heat exchanging desiccant beds on the outside is always functioning as the condenser for the heat pump refrigerant circuit while the other HXDB is decoupled from the heat pump circuit and serves only to dry air drawn into the building through the air passageways defined by the desiccant material surfaces. In this manner the HXDB functioning as the condenser is always able to have moisture-laden desiccant material surfaces to carry away the latent heat of condensation of refrigerant in the circulating tubes in the latent heat of evaporation of moisture on the desiccant material surfaces. When the desiccant material surfaces have dried out the HXDB's are switched so that the wet or moisture-laden HXDB becomes the condenser and the dry HXDB is used for adsorbing moisture from outside air drawn into the building. A much greater efficiency and coefficient of performance of the split unit air conditioning system is thereby achieved.

According to another combination, a heat pumping heat exchanging desiccant bed structure may be provided for example as illustrated in FIGS. 10 and 11 but having two sets of parallel circulating channels or tubes in heat exchange relationship with fins, plates, sheets or radiators bearing desiccant material surfaces. One of the two sets of tubes or channels may be coupled in a non-change of phase heat transfer liquid circulating system or circuit such as a water circulating system while the other set of tubes or channels is coupled in a heat pump refrigerant circulating system of circuit. By this expedient the heat exchanging desiccant bed may operate to import heat energy into the system or export heat energy out of the system using either a non-change of phase heat transfer liquid, a change of phase refrigerant liquid, or both, according to the available external energy sources.

In each of the heat exchanging desiccant bed air conditioning systems it may be advantageous to include conventional heat exchangers either upstream in the air flow from the HXDB, downstream in the air flow from the HXDB or both upstream and downstream as exemplified in the HX/DB/HX integrated heat exchanger of FIG. 11. Furthermore, the heat transfer liquid or refrigerant may circulate through the upstream heat exchanger first for greater pre-cooling of building air during the adsorption phase, or may circulate through the downstream heat exchanger first for greater after-cooling.

It is also noted that in each of the described and illustrated example embodiments of the invention and in the various combinations and permutations of the invention, there is generally a final evaporative cooling step, not shown, applied to the conditioned building air exiting from the coincident adsorption and evaporation phase. Thus, the building air processed through the heat exchanging desiccant bed and any subsidiary heat exchangers is dry, partially cooled air, which is then further cooled and humidified of achieve desired parameters in the comfort zone range by a final evaporative cooling step, not shown. Such evaporative cooling methods are well known, for example using a so-called "swamp cooler" or spray moisturizer.

Another expedient, according to the invention, to increase the work efficiency of the system as described, for example, in U.S. Ser. No. 750,932, is to further moisturizer or humidify warm humid building air upstream from the HXDB which is operating in the coincident adsorption and evaporation mode. Such moisturizing, for example, by spray moisturizing or using a swamp cooler amounts to an evaporative cooling step upstream from the adsorption bed which cools the building air in the direction of the desired temperature range and makes greater use of the desiccant bed to remove the excess added moisture. Basically, the work of the adsorption desiccant bed is used to achieve a lower temperature of the building air by evaporative cooling of the building air upstream from the desiccant bed all as further explained in U.S. Ser. No. 750,932.

In another embodiment of the invention, the desiccant bed air conditioning system and heat pump refrigerant system are combined in another coacting configuration. According to this embodiment, a heat exchanging desiccant bed air conditioning system of the type described in co-pending U.S. patent application Ser. No. 750,932, is provided. Hot and humid air to be conditioned passes through the air passageways of a first heat exchanging desiccant bed for adsorption of moisture on the extended surface area of the desiccant material during an adsorb cycle. At the same time, a coolant liquid such as water is circulated through the circulating channels of the HXDB in heat exchange relationship with the desiccant material surfaces for efficient removal of latent heat of condensation from the desiccant bed. The cooling liquid circulating through the HXDB during the adsorb cycle is derived from a cold tank or cold water storage tank and returns to the tank in a closed circuit.

At the same time hot recharge air flows through the air passageways of a second heat exchanging desiccant bed in the desorb phase or cycle for evaporating and removing moisture from the saturated or moisture-laden desiccant material surfaces. A heating liquid such as water circulates through the circulating channels of the HXDB in heat exchange relationship with the desiccant bed for importing heat from a hot tank or hot water storage tank into the system for increasing the efficiency and rate of evaporation from the desiccant material surfaces and regeneration of the desiccant bed.

When the first heat exchanging desiccant bed operating in the adsorption phase is saturated with moisture and the second heat exchanging desiccant bed has been recharged by drying during the desorption phase, the function of the HXDB's is switched and the first HXDB commences operation in the desorption phase for recharging and drying while the second HXDB commences operation in the adsorption phase for removing moisture and conditioning the building air. This is accomplished as fully set forth in U.S. Ser. No. 750,932 by the switching of valves in the respective circulating lines so that hot water or other heating liquid from the hot tank circulates through the first heat exchanging desiccant bed now in the desorption phase while the cold water or liquid coolant from the cold tank circulates in the second heat exchanging desiccant bed now in the adsorption phase. At the same time shutters or louvers are reversed so that building air to be conditioned flows through the second HXDB for adsorption in the desiccant bed air passageways while heated recharging air flows through the air passageways of the first HXDB for recharging.

According to the present invention, to this pair of parallel, complementary, alternate cycling non-change of phase heat transfer liquid circulating heat exchanging desiccant beds, is added a heat pump having an evaporator coil immersed in the cold tank or in heat exchange relationship with the circulating cold water, and a condenser coil immersed in the hot tank or in heat exchange relationship with the circulating hot water tank. By this arrangement, according to the present invention, heat energy returning to the cold tank in water or other heat transfer fluid circulating in the return line from the adsorption phase heat exchanging desiccant bed is continuously pumped out of the cold tank through the evaporator coil in the latent heat of vaporization of the refrigerant vapor and transferred to the hot tank through the condenser coil by the heat of condensation from the liquid refrigerant. As a result, the coolant liquid or cold water in the cold tank remains cold for efficient removal of heat from the adsorption desiccant bed increasing the efficiency of adsorption. At the same time the heating liquid or heat water in the hot tank remains hot for efficient recharging and drying of the desorbing desiccant bed in the desorption phase.

This is accomplished by what is effectively enthalpic matching and enthalpic pumping of both latent and sensible heat energy. The latent heat of condensation in the adsorption desiccant bed is carried away by the coolant liquid or cold water to the cold tank. It is then pumped or transferred in the latent heat of vaporization of the refrigerant and delivered to the hot tank as latent heat of condensation. This heat is then transferred to the desorption desiccant bed to provide the latent heat of evaporation of moisture desorbed from the desiccant material surfaces. Sensible heat is combined with the latent heat transfer throughout the cycle. Effectively, the latent heat and sensible heat associated with adsorption and condensation of moisture in the adsorption desiccant bed is ultimately delivered up as the latent and sensible heat of desorption and evaporation of moisture from the desorption desiccant bed.

Figure 12:
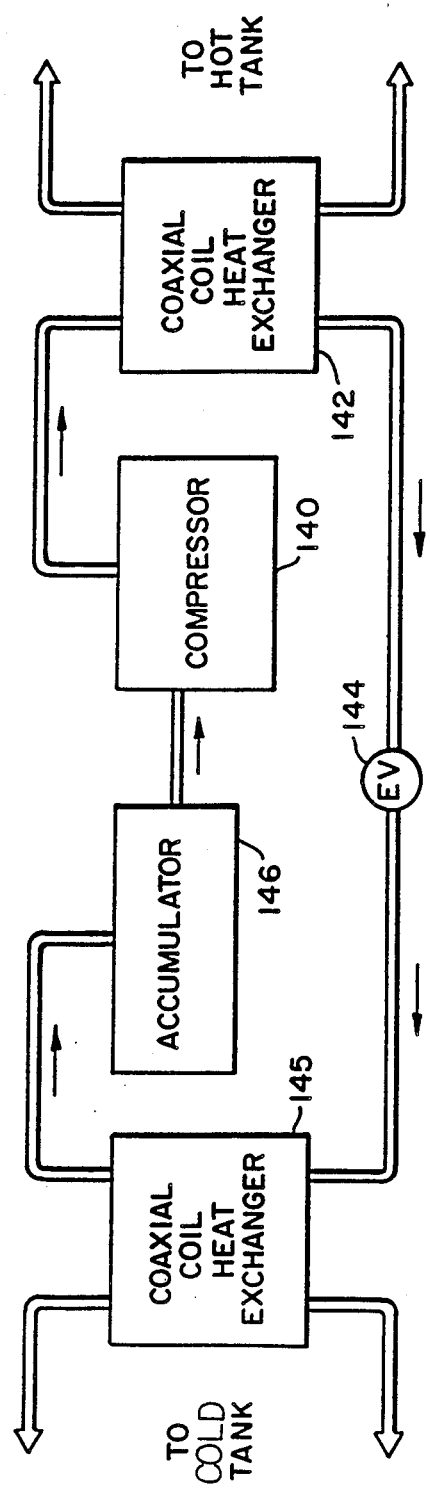
FIG. 12 is a schematic diagram of another generalized enthalpic heat pumping desiccant bed reverse cycle heating and cooling air conditioning system according to the invention.

Referring to FIG. 12, hot refrigerant gas is pumped from compressor 150 through a coaxial coil heat exchanger condenser 142 through which also circulates the hot water or other heat transfer liquid from the hot tank of a non-change-of-phase heat exchanging desiccant air conditioning system (not shown) of the type described in U.S. Ser. No. 750,932. The refrigerant condenses giving up its heat to the circulating water, then passes through expansion valve 144 expanding through coaxial coil heat exchanger evaporator 145. The refrigerant evaporates and picks up heat from the circulating cold water from the cold tank of the heat exchanging desiccant air conditioning system of U. S. Ser. No. 750,932 (not shown). The evaporated refrigerant returns to compressor 140 through accumulator 146.

The difference between this embodiment of the invention and the systems of FIGS. 1-11 is that in the systems FIGS. 1-11 the change of phase refrigerant circulates directly in the channels of the heat exchanging desiccant beds while in the latter embodiment the change of phase refrigerant circulates between the cold tank and hot tank circulating lines, one step removed from the heat exchanging desiccant beds. A non-change of phase heat transfer liquid circulating loop or link is therefore provided between the adsorption heat exchanging desiccant bed and the cold tank or cold water circulating line and between the desorption heat exchanging desiccant bed and the hot tank or hot water circulating line. The heat pump circuit is therefore one step removed from the air conditioning heat exchanging desiccant beds and a non-change of phase heat transfer fluid circulating link or loop is provided in each direction to complete the enthalpic impedance matching latent heat and sensible heat energy transfer between the reverse cycling heat exchanging desiccant beds.

The system of FIG. 12 provides substantial energy savings over conventional air conditioners. In addition to the 30% saving of energy by use of the condenser heat and heat of compression, the system permits load management by use of non-peak load energy with insulated hot and cold tanks.

The COP or coefficient of performance for this system is approximately 3.5 compared to the COP of 2.14 for conventional air conditioners. The SEER or seasonal energy efficiency ratio is 11.9 compared to the conventional SEER of 7.3. With solar heating of the hot water, the present invention achieves a COP of 5.3 and a SEER of 18.1. The peak load savings are substantial affording 30% to 80% reduction in use of peak energy.

While the invention has been described with reference to particular example embodiments, it is intended to cover all modifications and equivalents within the scope of the following claims.

I claim:

1. An improved method of desiccant bed air conditioning comprising:

circulating heat transfer liquid in liquid circulating channels in heat exchanging relationship with a desiccant bed having desiccant material surfaces defining air passageways through the desiccant bed;

storing relatively hot heat transfer liquid in a first storage tank;

storing relatively cold heat transfer liquid in a second storage tank;

alternately coupling the first storage tank for circulating relatively hot heat transfer liquid and the second storage tank for circulating relatively cold heat transfer liquid to the liquid circulating channels of the heat exchanging desiccant bed for alternately operating the desiccant bed respectively in a desorption mode and an adsorption mode;

and pumping heat from the second storage tank to the first storage tank.

2. The air conditioning method of claim 1 wherein the method of pumping heat uses a heat pump comprising a compressor, an evaporator heat exchanger, and a condenser heat exchanger with the evaporator heat exchanger being operatively coupled in heat exchange relationship with the second storage tank and the condenser heat exchanger being operatively coupled in heat exchange relationship with the first storage tank.

3. The method of claim 1 wherein the first and second storage tanks are insulated and when the step of pumping heat comprises using a heat pump during off peak hours and storing off peak energy using said first and second storage tanks.

4. An improved method of desiccant bed air conditioning using a desiccant bed having desiccant material surfaces defining air passageways through the bed and heat transfer liquid channel means in heat exchange relationship with the desiccant material surfaces comprising:

storing relatively high temperature heat transfer liquid in a hot tank;

storing relatively low temperature heat transfer liquid in a cold tank;

alternately coupling the hot tank and the cold tank to the heat transfer liquid channel means of the heat exchanging desiccant bed for alternately operating the desiccant bed respectively in a desorption and an adsorption mode;

and pumping heat from the cold tank to the hot tank using a heat pump operatively coupled in heat transfer relationship between the cold tank and hot tank for maintaining the temperature differential of relatively high temperature heat transfer liquid in the hot tank and relatively low temperature heat transfer liquid in the cold tank.

5. The air conditioning method of claim 4 comprising pumping heat during off peak hours and insulating the hot tank and cold tank for storing off peak energy.

* * * * *